(12) United States Patent
Rana et al.

(10) Patent No.: US 7,839,103 B1
(45) Date of Patent: *Nov. 23, 2010

(54) ADJUSTABLE FREQUENCY PWM DRIVER

(75) Inventors: Sakti P. Rana, Singapore (SG); Foo Leng Leong, Singapore (SG); Cheng Yong Teoh, Singapore (SG)

(73) Assignee: Marvell International Ltd., Hamilton (BM)

( * ) Notice: Subject to any disclaimer, the term of this patent is extended or adjusted under 35 U.S.C. 154(b) by 7 days.

This patent is subject to a terminal disclaimer.

(21) Appl. No.: 12/436,482

(22) Filed: May 6, 2009

Related U.S. Application Data (63) Continuation of application No. 11/103,755, filed on Apr. 12, 2005, now Pat. No. 7,531,975.

(60) Provisional application No. 60/618,508, filed on Oct. 13, 2004.

(51) Int. Cl.
*H02P 25/08* (2006.01)

(52) U.S. Cl. .................. 318/254.1; 318/599; 318/811; 360/69

(58) Field of Classification Search .............. 318/254.1, 318/439, 599, 811
See application file for complete search history.

(56) References Cited

U.S. PATENT DOCUMENTS

| | | |
|---|---|---|
| 4,072,883 A | 2/1978 | Beiter |
| 4,471,283 A | 9/1984 | Presley |
| 4,642,544 A | 2/1987 | Furumura et al. |
| 4,884,183 A | 11/1989 | Sable |
| 5,081,409 A | 1/1992 | Goff |
| 5,343,382 A | 8/1994 | Hale et al. |
| 5,537,027 A | 7/1996 | Jordan |
| 5,574,392 A | 11/1996 | Jordan |
| 5,986,426 A | 11/1999 | Rowan |
| 6,005,316 A | 12/1999 | Harris |
| 6,020,773 A | 2/2000 | Kan et al. |
| 6,188,261 B1 | 2/2001 | Nosaka et al. |
| 6,320,434 B1 | 11/2001 | Chang et al. |
| 6,373,730 B1 | 4/2002 | Komatsu et al. |
| 6,426,569 B1 | 7/2002 | Ichikawa et al. |
| 6,498,698 B1 | 12/2002 | Golowka et al. |
| 6,515,443 B2 | 2/2003 | Kelly et al. |
| 6,747,838 B2 | 6/2004 | Korbel et al. |
| 6,757,129 B2 | 6/2004 | Kuroiwa et al. |
| 6,762,901 B2 | 7/2004 | Hill |

(Continued)

FOREIGN PATENT DOCUMENTS

EP 0520663 A2 6/1992

(Continued)

*Primary Examiner*—Walter Benson
*Assistant Examiner*—David S Luo (57) ABSTRACT

A driver for a motor in a device includes a reference generator to generate a reference value. A clock management module receives a plurality of clock signals. Each clock signal has a corresponding frequency that is different relative to the corresponding frequency of another clock signal. A clock management module selects a different clock signal of the plurality of clock signals for output from the clock management module at different times during operation of the device. A ramp generating module generates a ramp signal in accordance with the corresponding frequency associated with the selected clock signal. A first pulse width modulation module receives the reference signal and the ramp signal. The first pulse width modulation module outputs a first pulse width modulation driver signal for driving the motor based on the reference signal and the ramp signal.

15 Claims, 10 Drawing Sheets

U.S. PATENT DOCUMENTS

| | | |
|---|---|---|
| 6,801,382 B2 | 10/2004 | Kimura et al. |
| 6,804,131 B2 | 10/2004 | Galbiati et al. |
| 6,819,072 B2 | 11/2004 | White et al. |
| 6,917,172 B2 | 7/2005 | Brenden et al. |
| 7,035,032 B2 | 4/2006 | Tanner |
| 7,068,455 B2 | 6/2006 | Tanner |
| 7,072,138 B2 * | 7/2006 | Schmidt .................. 360/78.04 |
| 7,092,197 B2 * | 8/2006 | El-Sherif et al. .............. 360/75 |
| 7,230,787 B2 | 6/2007 | Hatagami |
| 2002/0039335 A1 | 4/2002 | Masaki et al. |
| 2002/0084760 A1 | 7/2002 | Messenger et al. |
| 2004/0100722 A1 | 5/2004 | Kokami |
| 2004/0125623 A1 | 7/2004 | Sankman et al. |
| 2004/0189221 A1 | 9/2004 | Kurosawa et al. |
| 2005/0036228 A1 | 2/2005 | Kimura et al. |

FOREIGN PATENT DOCUMENTS

| | | |
|---|---|---|
| JP | 62-065503 | 3/1987 |

* cited by examiner

ADJUSTABLE FREQUENCY PWM DRIVER

CROSS-REFERENCE TO RELATED APPLICATIONS

This application is a continuation of U.S. patent application Ser. No. 11/103,755, filed Apr. 12, 2005, which claims the benefit of U.S. Provisional Application No. 60/618,508, filed Oct. 13, 2004. The disclosures of the above applications are incorporated herein by reference.

FIELD OF THE INVENTION

The present invention relates to hard disk drives, and more particularly to systems for controlling the duty cycle of a spindle motor driver of a hard disk drive.

BACKGROUND OF THE INVENTION

Electronic devices such as computers, laptops, personal video recorders (PVRs), MP3 players, game consoles, set-top boxes, digital cameras, and other electronic devices often need to store a large amount of data. Storage devices such as hard disk drives (HDD) may be used to meet these storage requirements. Some of these devices may be portable devices that rely on battery power. For these devices, low power consumption of the HDD is important. Furthermore, low noise is also an important design issue. As the inductance of the HDD increases, current ripple also tends to increase. Current ripple increases noise and dissipates power.

Figure 1:
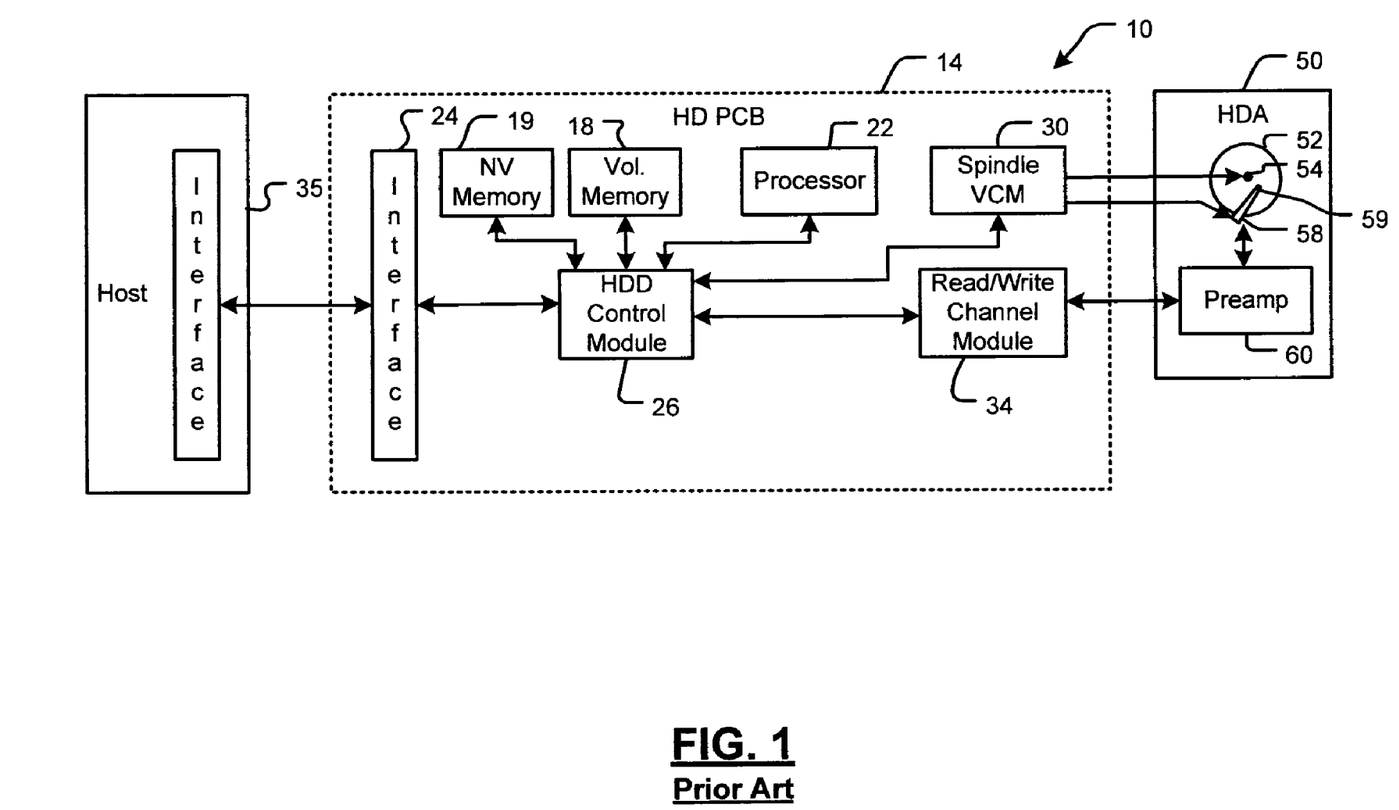
FIG. 1 is a functional block diagram of a Hard Disk Drive (HDD) system according to the prior art.

Referring now to FIG. 1, a HDD system 10 is shown to include a HDD PCB 14. A buffer 18 stores read, write and/or volatile control data that is associated with the control of the HDD system 10. The buffer 18 usually employs volatile memory having low latency. For example, SDRAM or other types of low latency memory may be used. Nonvolatile memory 19 such as flash memory may also be provided to store critical data such as nonvolatile control code.

A processor 22 arranged on the HDD PCB 14 performs data and/or control processing that is related to the operation of the HDD system 10. A hard disk control module (HDC) 26 communicates with an input/output interface and with a spindle/voice coil motor (VCM) module 30 and/or a read/write channel module 34. The HDC 26 coordinates control of the spindle/VCM driver 30, the read/write channel module 34 and the processor 22 and data input/output with a host 35 via the interface 24.

During write operations, the read/write channel module 34 encodes the data to be written onto a read/write device 59. The read/write channel module 34 processes the write signal for reliability and may apply, for example, error correction coding (ECC), run length limited coding (RLL), and the like. During read operations, the read/write channel module 34 converts an analog read signal output of the read/write device 59 to a digital read signal. The converted signal is then detected and decoded by known techniques to recover the data that was written on the HDD.

A hard disk drive assembly (HDDA) 50 includes one or more hard drive platters 52 that include magnetic coatings that store magnetic fields. The platters 52 are rotated by a spindle motor that is schematically shown at 54. Generally the spindle motor 54 rotates the hard drive platter 52 at a controlled speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

The read/write device 59 is located near a distal end of the read/write arm 58. The read/write device includes a write element such as an inductor that generates a magnetic field. The read/write device 59 also includes a read element (such as a magneto-resistive (MR) element) that senses the magnetic field on the platter 52. The HDDA 50 includes a preamp circuit 60 that amplifies the analog read/write signals. When reading data, the preamp circuit 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platter 52 and is used to represent data.

Figure 2:
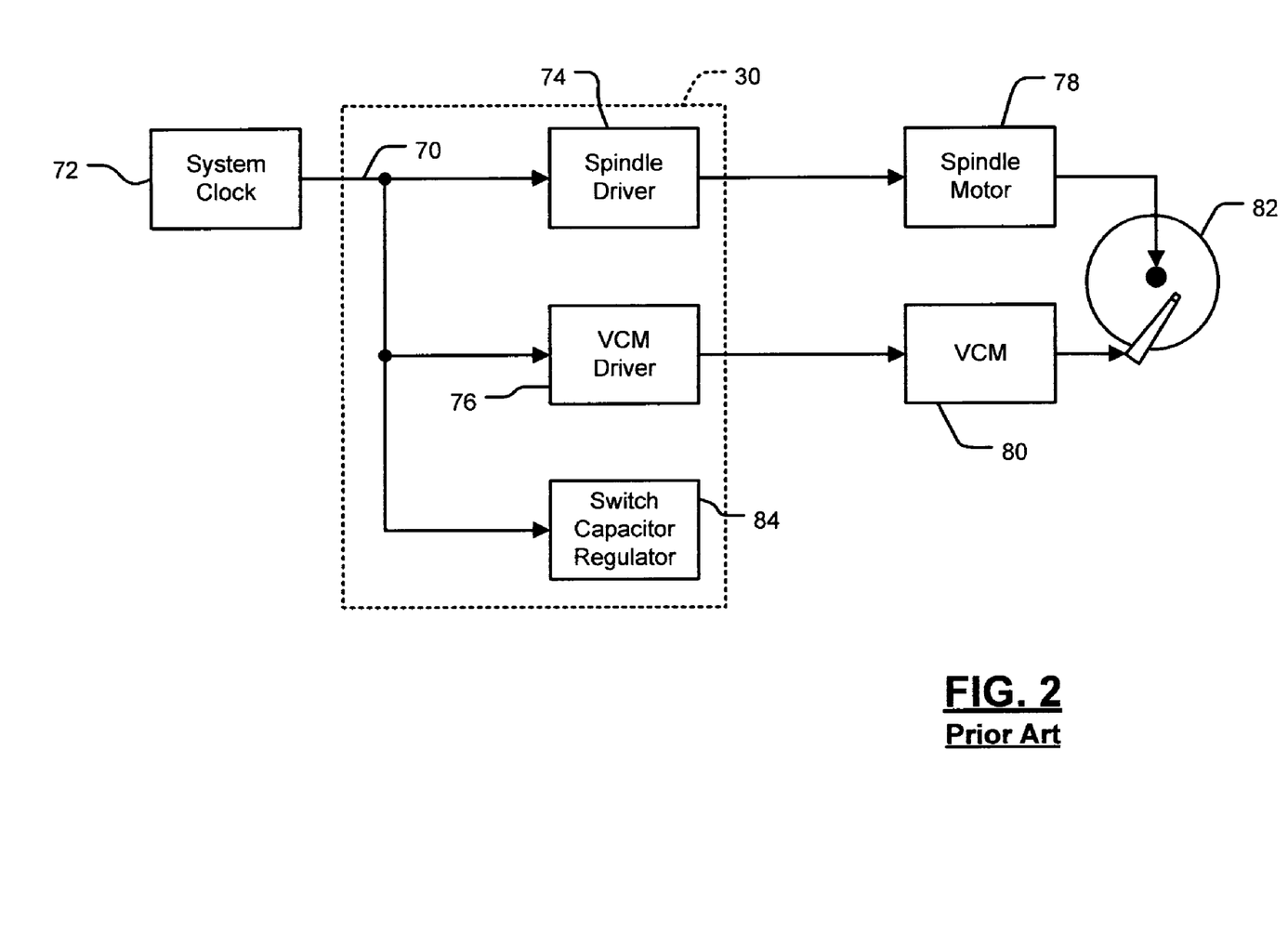
FIG. 2 is a more detailed functional block diagram of a spindle/VCM driver according to the prior art.

Referring now to FIG. 2, the spindle/VCM driver 30 receives a system clock signal 70 from a system clock 72, which may be generated by another device such as a PCB system on chip (SOC). The spindle/VCM driver 30 includes a spindle driver 74 and a VCM driver 76. The spindle driver 74 outputs drive signals to a spindle motor 78. The VCM driver 76 outputs drive signals to the VCM 80. Both the spindle driver 74 and the VCM driver 76 receive the system clock signal 70.

The spindle driver 74 generates pulse width modulation (PWM) signals that rotate the spindle motor 78. The PWM signals are based on the system clock signal 70. The system clock signal 70 is also provided to additional spindle/VCM components such as the VCM driver 76 and a switch capacitor regulator 84.

Figure 3:
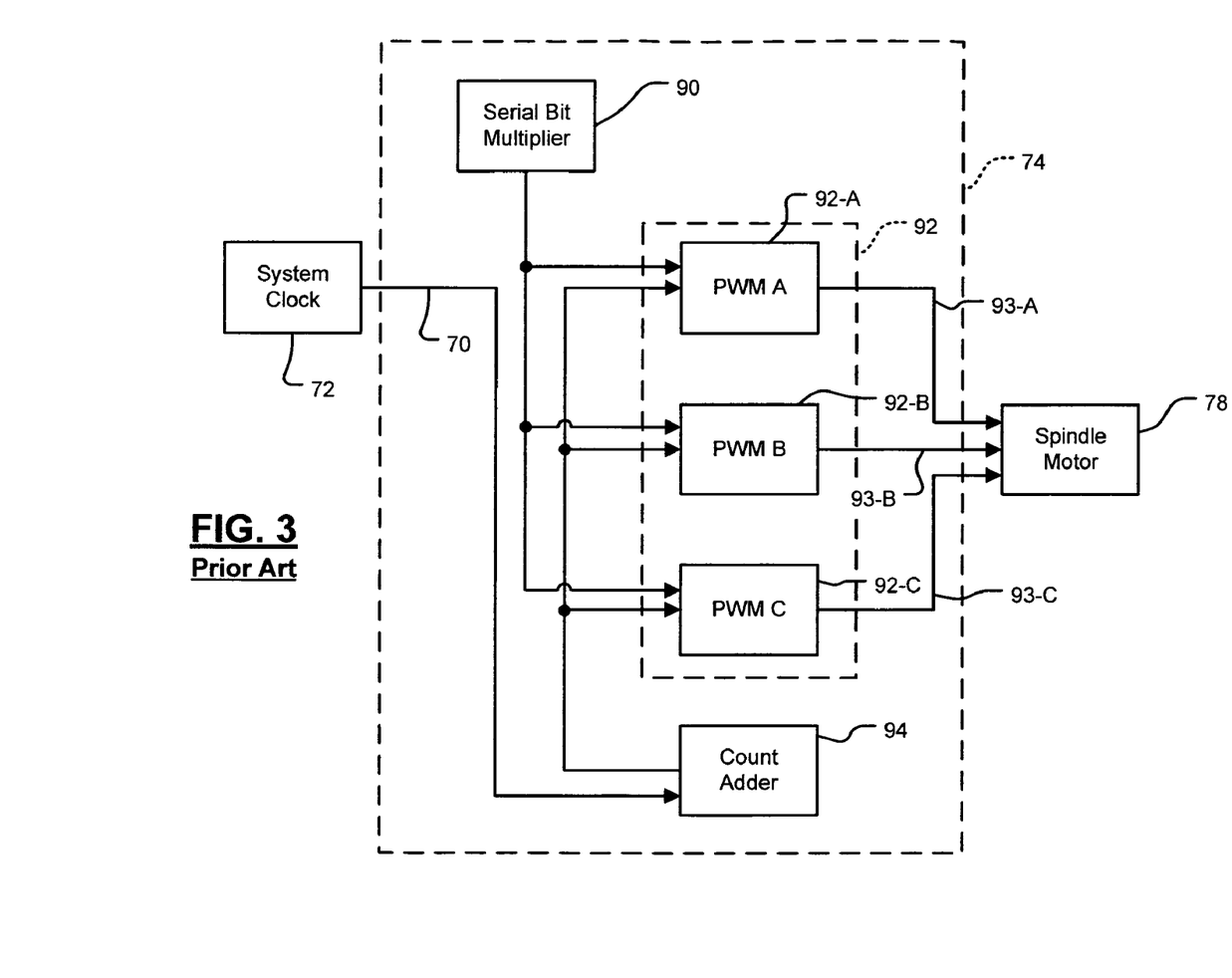
FIG. 3 is a more detailed functional block diagram of a spindle driver according to the prior art.
Figure 4:
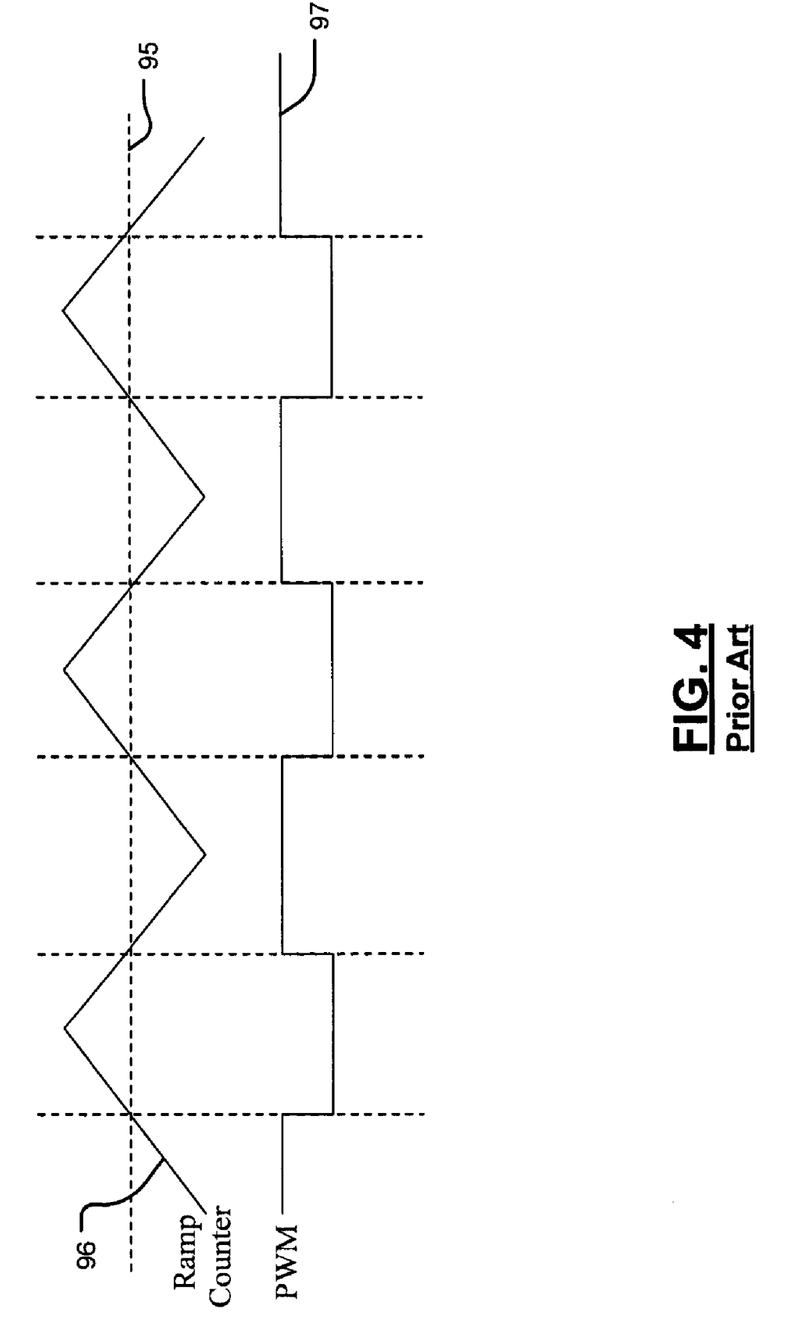
FIG. 4 is a graph showing reference, ramp and PWM signals according to the prior art.
Figure 5A:
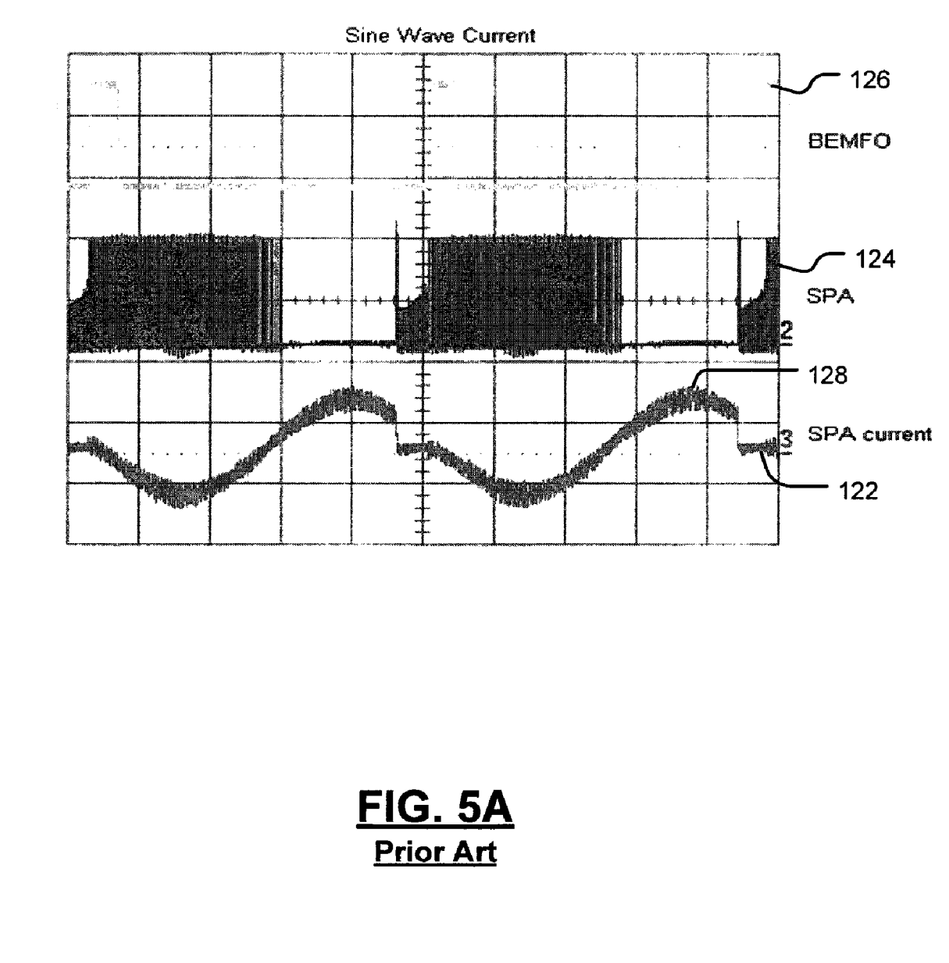
FIG. 5A includes graphs showing a spindle motor phase current, voltage and back electromotive force (EMF) according to the prior art.
Figure 5B:
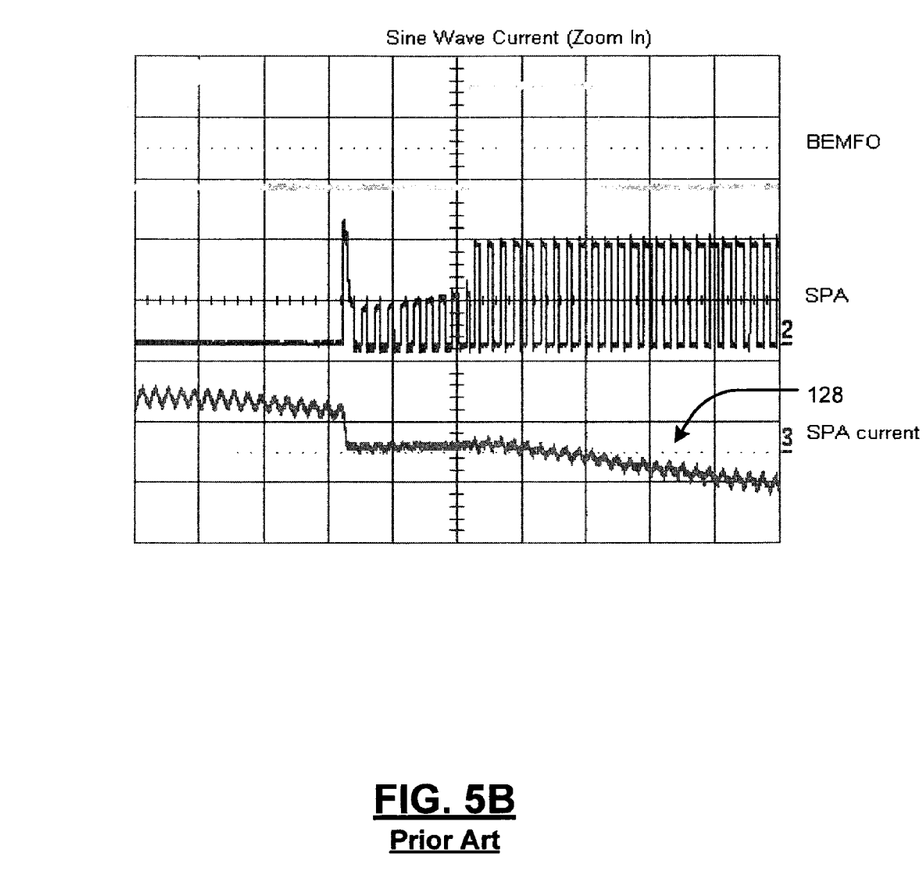
FIG. 5B is an enlarged view of part of FIG. 5A.

Referring now to FIGS. 3 and 4, the spindle driver 74 includes a serial bit multiplier 90, a PWM generator 92 and a count adder or ramp generator 94. The count adder 94 uses the system clock signal to generate a ramp signal. The serial bit multiplier 90 generates a reference value. The PWM generator 92 includes phase modules A, B and C, which are labeled 92-A, 92-B and 92-C in FIG. 3. Each phase module compares the reference value to the output of the count adder 94. As shown in FIG. 4, when the reference value 95 exceeds the ramp counter signal 96, the PWM signal 97 goes high (or low). When the ramp counter 96 exceeds the reference value 95, the PWM signal 97 goes low (or high). Phase signals 93-A, 93-B and 93C are output by the PWM generator 92 to the spindle motor 78. Referring now to FIGS. 5A and 5B, current 122, voltage 124 and back EMF 126 are shown. As can be seen at 128, the current 122 has undesirably high current ripple.

SUMMARY OF THE INVENTION

A spindle/voice coil motor (VCM) driver according to the present invention includes a clock management module that receives a system clock signal and a second clock signal, and that selects one of the system clock signal or the second clock signal as a selected clock signal. A reference generating module generates a reference signal. A ramp generating module receives the selected clock signal and generates a ramp signal. A first pulse width modulation (PWM) module receives the reference signal and the ramp signal and outputs a first PWM driver signal based thereon.

In other features of the invention, the system clock signal has a first frequency and the second clock signal has a second frequency. The second frequency is greater than the first frequency.

In still other features of the invention, the spindle/VCM driver further includes a second PWM module that receives the reference signal and the ramp signal and outputs a second PWM driver signal based thereon. A third PWM module receives the reference signal and the ramp signal and outputs a third PWM driver signal based thereon.

In yet other features of the invention, the first PWM driver signal has a first state when the ramp signal is greater than the reference signal and has a second state when the ramp signal is less than the reference signal. The ramp generating module generates the ramp signal based on the selected clock signal.

In still other features of the invention, the selected clock signal is selected based on current ripple of the first PWM driver signal.

In yet other features of the invention, a hard disk drive includes the spindle/VCM driver. The selected clock signal is selected based on at least one of an inductance of the hard disk drive and/or power dissipation of the hard disk drive.

In still other features of the invention, a spindle driver for a hard disk drive includes a clock management module that receives a system clock signal and M clock signals each having a different frequency, where M is an integer greater than or equal to one, and that selects one of the system clock signal or the M clock signals as a selected clock signal. A reference generating module generates a reference signal. A ramp generating module receives the selected clock signal and generates a ramp signal. A first pulse width modulation (PWM) module receives the reference signal and the ramp signal and outputs a first PWM driver signal based thereon.

In yet other features of the invention, a method for driving a spindle/voice coil motor includes receiving a system clock signal and a second clock signal. One of the system clock signal or the second clock signal is selected as a selected clock signal. A ramp signal is generated based on the selected clock signal. A PWM driver signal is generated based on the ramp signal and a reference signal.

In still other features of the invention, the reference signal is generated. The at least one second PWM driver signal is generated based on the ramp signal and the reference signal.

In yet other features of the invention, one of the system clock signal and the second clock signal is selected based on current ripple of the first PWM driver signal.

In still other features of the invention, a method for driving a spindle of a hard disk drive includes receiving a system clock signal and M clock signals having a different frequency, where M is an integer greater than or equal to one. One of the system clock signal or the M clock signals is selected as a selected clock signal. A ramp signal is generated based on the selected clock signal. A first PWM driver signal is generated based on the ramp signal and a reference signal.

In yet other features of the invention, a spindle/voice coil motor (VCM) driver includes clock managing means for receiving a system clock signal and a second clock signal, and for selecting one of the system clock signal or the second clock signal as a selected clock signal. Reference generating means generate a reference signal. Ramp generating means receives the selected clock signal and generates a ramp signal. First pulse width modulating means receives the reference signal and the ramp signal, and outputs a first PWM driver signal based thereon.

In still other features of the invention, the spindle/VCM driver further includes second pulse width modulating means for receiving the reference signal and the ramp signal, and for outputting a second PWM driver signal based thereon. Third pulse width modulating means receives the reference signal and the ramp signal, and outputs a third PWM driver signal based thereon.

In yet other features of the invention, a spindle driver for a hard disk drive includes clock management means for receiving a system clock signal and M clock signals each having a different frequency, where M is an integer greater than or equal to one, and for selecting one of the system clock signal or the M clock signals as a selected clock signal. Reference generating means generates a reference signal. Ramp generating means receives the selected clock signal and generates a ramp signal. First pulse width modulating means receives the reference signal and the ramp signal, and outputs a first PWM driver signal based thereon.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module, driver and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 6A:
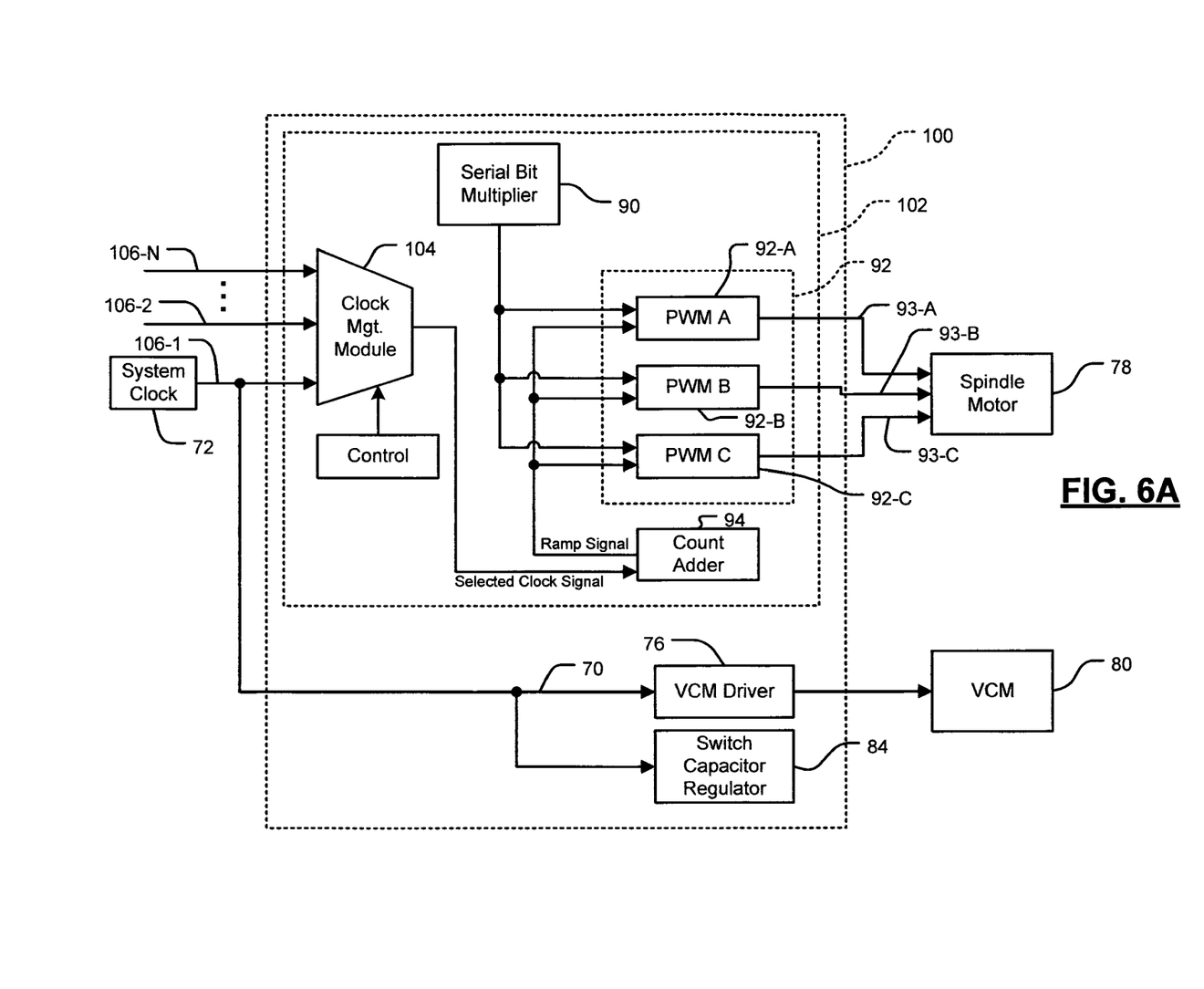
FIGS. 6A and 6B are functional block diagrams of spindle/VCM driver including a spindle driver with a clock management module according to the present invention.
Figure 6B:
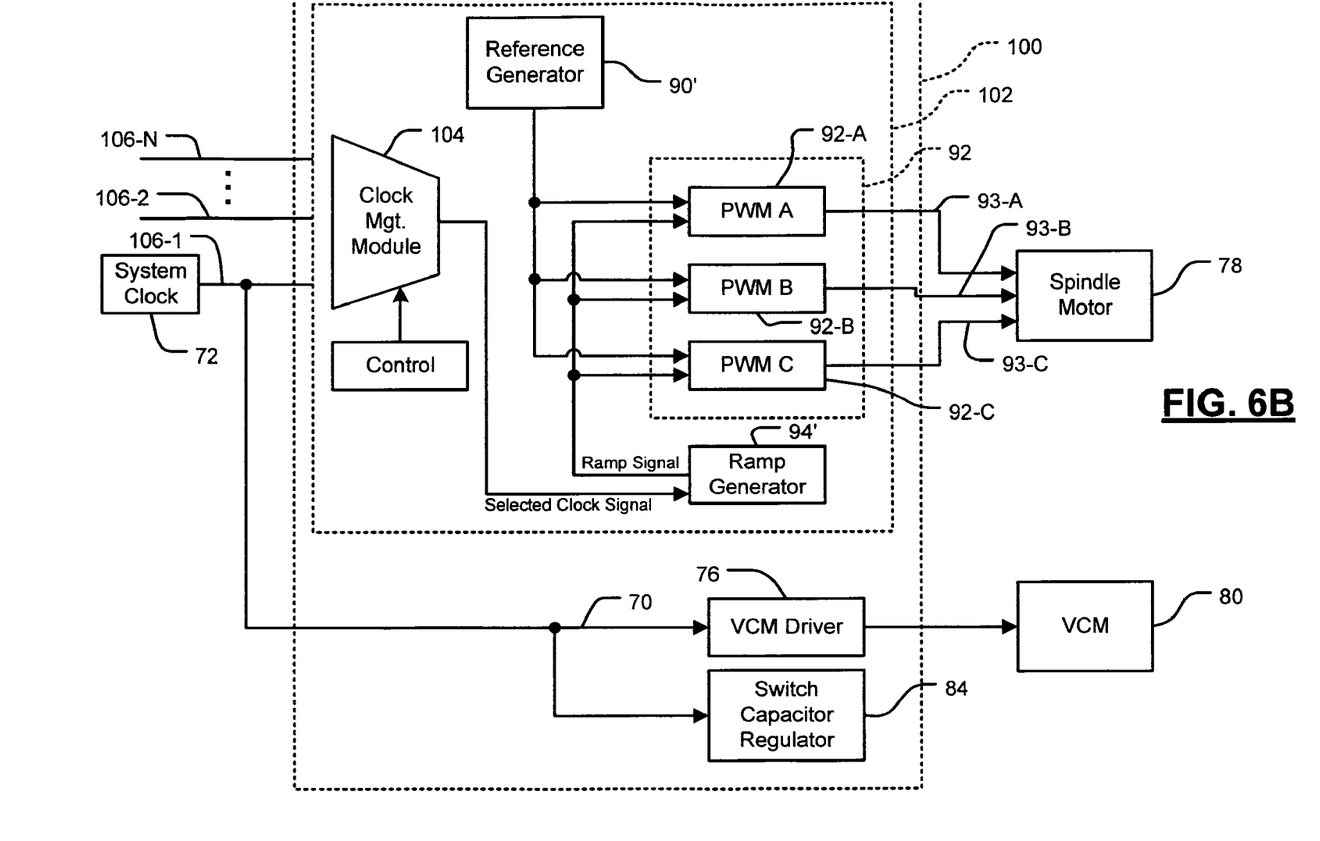

Referring now to FIGS. 6A and 6B, a spindle/VCM driver 100 according to the present invention is shown. In FIG. 6B, the serial bit multiplier 90 and count adder 94 of FIG. 6A are replaced by a reference generator 90' and a ramp generator 94'. The spindle/VCM driver 100 includes a spindle driver 102 and the VCM driver 76. The spindle driver 102 includes a clock management module 104 that receives a system clock signal 106-1 from the system clock 72.

The system clock 72 outputs the system clock signal 106-1 at a first frequency. For example, the system clock signal 106-1 may cycle at a system clock frequency of 20 MHz, although other clock speeds may be used. Other modules and/or components of the spindle/VCM driver 100 operate at the first frequency. For example, the VCM driver 76, and the switch capacitor regulator 84 receive the system clock signal 70. Additional components of the spindle/VCM driver 100 may also operate at the system clock frequency.

The clock management module 104 also receives one or more additional clock signals 106-2, 106-3, . . . , and 106-N (collectively clock signals 106). The clock signals 106-2, 106-3, . . . , and 106-N have different frequencies than the system clock frequency 106-1. For example, the clock signals 106-2, 106-3, . . . , and 106-N may include 40 MHz, 60 MHz, and 80 MHz clocks. Based on a control input, the clock management module 104 selects one of the clock signals 106. In other words, the clock management module 104 selects a clock signal from the system clock signal 106-1 or the other clock signals 106-2, 106-3, . . . , 106-N. In some implementations, a control input to the clock management module is an external input that is adjusted based on current ripple, power dissipation, HDD inductance and/or other design factors.

Referring back to FIG. 4, the counter adder 94 was incremented and decremented by the system clock to generate a ramp signal. When the selected clock output of clock management module 104 has a higher frequency than the system clock signal, the counter adder 94 is incremented and decremented by the selected clock signal more quickly. As a result, the PWM signals 93 cycle more quickly and current ripple is reduced.

Figure 7A:
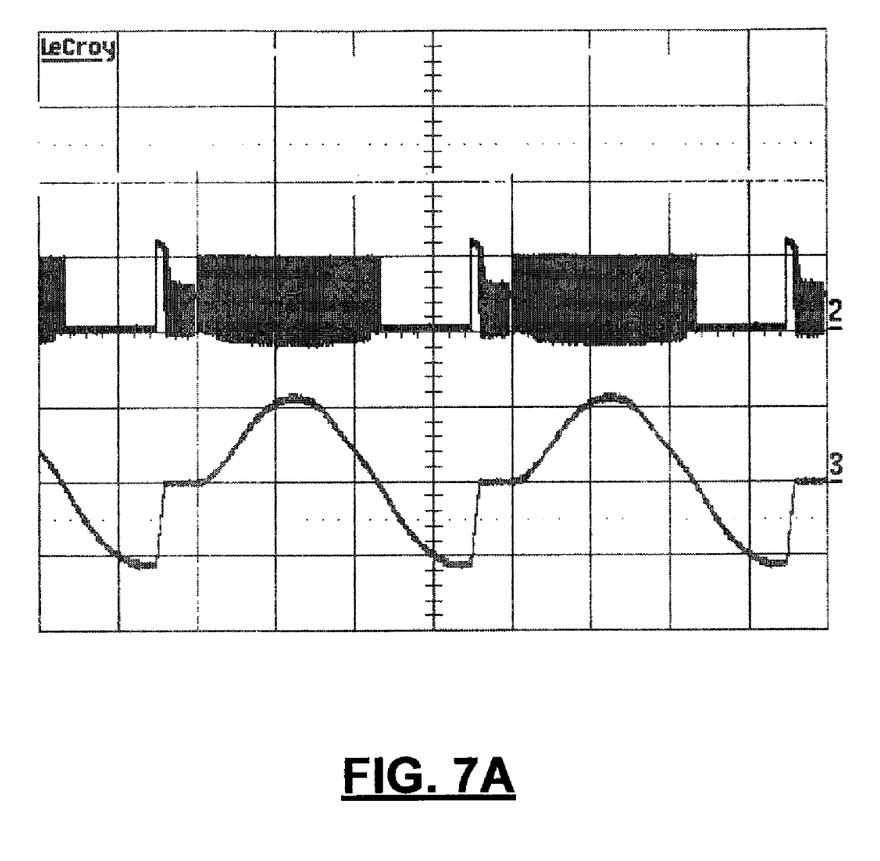
FIGS. 7A and 7B are graphs showing phase current with reduced ripple, voltage and back EMF according to the present invention.
Figure 7B:
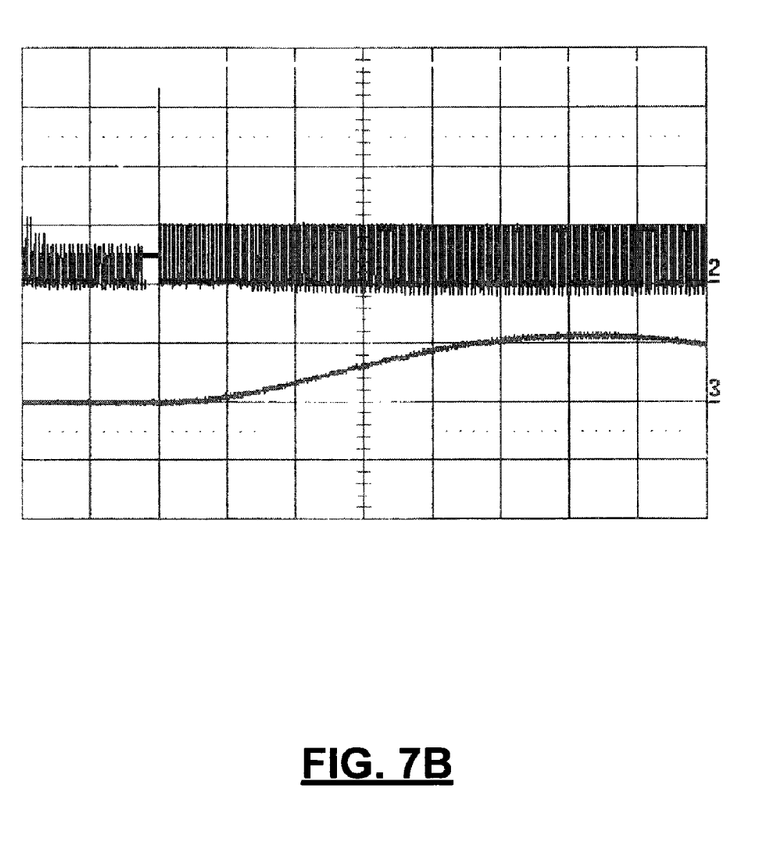

Referring now to FIGS. 7A and 7B, the spindle/VCM driver 100 of the present invention reduces voltage slew and current ripple. In other words, to reduce voltage slew, and therefore current ripple, the spindle driver increases the frequency of the PWM output 97 (referring back to FIG. 4). In order to accomplish this, the frequency of the ramp counter 96 is increased so that the ramp counter 96 crosses the reference 95 at a greater rate. Referring back to FIGS. 6A and 6B, the spindle/VCM driver 100 changes the clock frequency input to the PWM modules of the spindle motor driver 74 while maintaining the system clock frequency for the remainder of the system. In this manner, the current ripple of the PWM output is improved, and power is conserved by operating the remainder of the system at a lower clock frequency.

Therefore, the clock frequency for the PWM system can be adjusted to minimize the current ripple of the PWM output. Because additional factors may affect the performance of the system, the desired clock frequency may be determined based on a variety of parameters, such as inductance of the HDD. The spindle driver provides adjustable clock frequencies in order to accommodate different hard disk drives. For example, a manufacturer may adjust the clock management module to select a clock frequency to minimize current ripple for a particular hard disk drive.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A driver for a motor in a device, the driver comprising:
a reference generator to generate a reference signal;
a clock management module to
receive a plurality of clock signals, each clock signal having a corresponding frequency that is different relative to the corresponding frequency of another clock signal; and
select a different clock signal of the plurality of clock signals for output from the clock management module at different times during operation of the device;
a ramp generating module to generate a ramp signal in accordance with the corresponding frequency associated with the selected clock signal; and
a first pulse width modulation module to
receive the reference signal and the ramp signal; and
output a first pulse width modulation driver signal for driving the motor based on the reference signal and the ramp signal.

2. The driver of claim 1, wherein the clock management module selects a different clock signal based on current ripple, power dissipation, or an inductance associated with the device.

3. The driver of claim 1, further comprising a second pulse width modulation module to:
receive the reference signal and the ramp signal; and
output a second pulse width modulation driver signal for driving the motor based on the reference signal and the ramp signal.

4. The driver of claim 3, further comprising a third pulse width modulation module to:
receive the reference signal and the ramp signal; and
output a third pulse width modulation driver signal for driving the motor based on the reference signal and the ramp signal.

5. The driver of claim 4, wherein:
the device is a hard disk drive; and
the motor is a spindle motor.

6. The driver of claim 5, wherein:
the plurality of clock signals comprises a system clock signal; and
the driver further comprises:
a voice coil motor driver to operate in accordance with the frequency corresponding to the system clock during the different times.

7. The driver of claim 6, further comprising a switch capacitor regulator to operate in accordance with the frequency corresponding to the system clock during the different times.

8. The driver of claim 1, wherein:
the reference generator comprises a serial bit multiplier; and
the ramp generating module comprises a count adder.

9. A method for generating a signal to drive a motor in a device, the method comprising:
generating a reference signal;
selecting a different clock signal from among a plurality of clock signals at different times during operation of the device, each clock signal having a corresponding frequency that is different relative to the corresponding frequency of another clock signal;
generating a ramp signal in accordance with the corresponding frequency associated with the selected clock signal; and
outputting a first pulse width modulation driver signal for driving the motor based on the reference signal and the ramp signal.

10. The method of claim 9, wherein selecting a different clock signal comprises selecting a different clock signal based on current ripple, power dissipation, or an inductance associated with the device.

11. The method of claim 9, further comprising:
outputting a second pulse width modulation driver signal for driving the motor based on the reference signal and the ramp signal.

12. The method of claim 11, further comprising:
outputting a third pulse width modulation driver signal for driving the motor based on the reference signal and the ramp signal.

13. The method of claim 12, wherein:
the device is a hard disk drive; and
the motor is a spindle motor.

14. The method of claim 13, wherein:
the plurality of clock signals comprises a system clock signal; and
the method further comprises:
operating a voice coil motor driver in accordance with the frequency corresponding to the system clock during the different times.

15. The method of claim 14, further comprising operating a switch capacitor regulator in accordance with the frequency corresponding to the system clock during the different times.

* * * * *